(12) United States Patent
Shani et al.

(10) Patent No.: US 9,986,519 B2
(45) Date of Patent: May 29, 2018

(54) SYNCHRONIZATION BY DIFFERENCE BETWEEN LINK LAYER AND PROCESSOR TIME STAMPS

(71) Applicant: TEXAS INSTRUMENTS INCORPORATED, Dallas, TX (US)

(72) Inventors: Oren Shani, Kfar-Saba (IL); Guy Mishol, Givatayim (IL); Uri Weinrib, Lod (IL)

(73) Assignee: Texas Instruments Incorporated, Dallas, TX (US)

( * ) Notice: Subject to any disclaimer, the term of this patent is extended or adjusted under 35 U.S.C. 154(b) by 273 days.

(21) Appl. No.: 14/788,330

(22) Filed: Jun. 30, 2015

(65) Prior Publication Data

US 2016/0262120 A1   Sep. 8, 2016

Related U.S. Application Data

(60) Provisional application No. 62/128,254, filed on Mar. 4, 2015.

(51) Int. Cl.
| | |
|---|---|
| *H04W 56/00* | (2009.01) |
| *H04W 40/24* | (2009.01) |
| *H04W 88/08* | (2009.01) |
| *H04W 84/12* | (2009.01) |

(52) U.S. Cl.
CPC ....... *H04W 56/001* (2013.01); *H04W 40/244* (2013.01); *H04W 84/12* (2013.01); *H04W 88/08* (2013.01)

(58) Field of Classification Search
CPC . H04B 3/30; H04B 3/54; H04B 3/542; H04B 3/544; H04B 13/005; H04B 2203/5408; G06Q 10/06; G06Q 50/32; H04H 20/42; H04J 3/06; H04J 3/0685; H04L 5/005; H04L 9/0861; H04L 12/26; H04L 25/024; H04L 69/22; H04W 40/244; H04W 52/0229; H04W 56/001; H04W 56/005; H04W 56/0015; H04W 56/00
See application file for complete search history.

(56) References Cited

U.S. PATENT DOCUMENTS 8,279,897 B2   10/2012  Lee et al.
8,427,987 B2   4/2013   Stocks
(Continued)

FOREIGN PATENT DOCUMENTS

WO   2011-108870 A2   9/2011

*Primary Examiner* — Walter Divito
*Assistant Examiner* — Dharmesh Patel
(74) *Attorney, Agent, or Firm* — Lawrence J. Bassuk; Charles A. Brill; Frank D. Cimino

(57) ABSTRACT

A circuit includes a processor to store a beacon timestamp generated from a wireless network. An output port controlled by the processor causes an interrupt that initiates a capture of a link layer timestamp relative to the beacon timestamp. An input port on the processor receives the link layer time stamp. A synchronizer captures a processor timestamp relative to the beacon timestamp and determines a time offset value relative to the received link layer time stamp by computing a difference between the processor timestamp and the link layer timestamp. The time offset value is combined with the processor timestamp to synchronize the processor with respect to the beacon timestamp.

18 Claims, 4 Drawing Sheets

(56) References Cited

U.S. PATENT DOCUMENTS

| | | | |
|---|---|---|---|
| 2004/0008661 A1* | 1/2004 | Myles | H04J 3/0664 370/350 |
| 2006/0233203 A1* | 10/2006 | Iwamura | H04N 21/2368 370/516 |
| 2008/0040759 A1* | 2/2008 | She | H04L 29/06027 725/81 |
| 2013/0279381 A1* | 10/2013 | Sampath | H04W 48/08 370/311 |

* cited by examiner

SYNCHRONIZATION BY DIFFERENCE BETWEEN LINK LAYER AND PROCESSOR TIME STAMPS

CROSS-REFERENCE TO RELATED APPLICATION

This application claims the benefit of U.S. Provisional Patent Application 62/128,254 filed on 4 Mar. 2015, and entitled WIFI ACCURATE SYNCHRONIZATION BASED ON BEACONS, the entirety of which is incorporated by reference herein.

TECHNICAL FIELD

This disclosure relates to network communications and more specifically to synchronizing clocks between network devices based on wireless access point beacons.

BACKGROUND

An ever increasing number of system implementations include dispersing system devices across a given area and then providing connectivity between the devices via wireless links. For example, a common audio application involves generating music at one device and playing the music at one or more speaker devices that are connected to the wireless link. To enable wireless connectivity between system devices, a wireless access point (AP) can be employed that allows wireless devices to connect to a wired network using Wi-Fi, or related standards. The AP usually connects to a router (via a wired network) as a standalone device, but it can also be an integral component of the router itself. An AP is differentiated from a hotspot, which is the physical space where the wireless service is provided. The AP normally connects directly to a wired Ethernet connection where the AP then provides wireless connections using radio frequency links for other devices to utilize the respective wired connection of the AP.

Most AP's support the connection of multiple wireless devices to one wired connection however other configurations are possible. Modern APs are built to support a standard for sending and receiving data using these radio frequencies. Those standards and the frequencies are defined by the IEEE, where the majority of APs use IEEE 802.11 standards, for example. One issue with connecting system components via wireless links in this manner involves coordination among system components across the wireless network. In conventional wired systems, such coordination is not an issue since application commands can be sent from one device and received by another device at almost instantaneous speeds via the wired communications of the network.

SUMMARY

This disclosure relates to synchronizing clocks between network devices based on wireless access point beacons. In one example, a circuit includes a processor to store a beacon timestamp generated from a wireless network. An output port controlled by the processor causes an interrupt that initiates a capture of a link layer timestamp relative to the beacon timestamp. An input port on the processor receives the link layer time stamp. A synchronizer captures a processor timestamp relative to the beacon timestamp and determines a time offset value relative to the received link layer time stamp by computing a difference between the processor timestamp and the link layer timestamp. The time offset value is combined with the processor timestamp to synchronize the processor with respect to the beacon timestamp.

In another example, a system includes a link layer to receive a beacon timestamp from a wireless network. The system includes a processor to receive the beacon timestamp from the link layer. An output port controlled by the processor causes an interrupt at the link layer to initiate a capture of a link layer timestamp at the link layer relative to the beacon timestamp. An input port on the processor receives the link layer time stamp from the link layer in response to the interrupt at the link layer. A synchronizer captures a processor timestamp relative to the beacon timestamp and determines a time offset value relative to the received link layer time stamp from the link layer by computing a difference between the processor timestamp and the link layer timestamp. The time offset value is combined with the processor timestamp to synchronize the processor with respect to the beacon timestamp received at the link layer.

In yet another example, a method includes receiving a beacon timestamp from a wireless network. The method includes generating an interrupt to initiate a capture of a link layer timestamp relative to the beacon timestamp. The method includes capturing a processor timestamp relative to the beacon timestamp. This includes determining a time offset value relative to the link layer time stamp by computing a difference between the processor timestamp and the link layer timestamp. The time offset value is combined with the processor timestamp to synchronize at least two wireless devices operating on the wireless network.

DETAILED DESCRIPTION

This disclosure relates to synchronizing clocks between network devices based on wireless access point beacons. Systems and methods are provided for accurate synchronization between wireless devices over the air where device clocks can be synchronized between/across device protocol layers based on received beacon timestamps from a wireless access point that transmits the beacons at predetermined intervals. Less than five microsecond synchronization can be achieved between a substantial number of wireless devices connected to the same access point, for example. Synchronization can be achieved by wireless network devices based on beacon packets arriving from the access point where any access point can be utilized for the synchronization task. Each device can capture the beacons and upload its accurate timestamp and sequence number to the respective device application layer. The timestamp can be captured during the beacon's preamble, for example. Based on input and output handshaking between device processing layers and wireless link layers that receive the beacons, synchronization can be determined as a time offset value determined between the respective timing of each layer with respect to the captured beacon timestamp.

Figure 1:
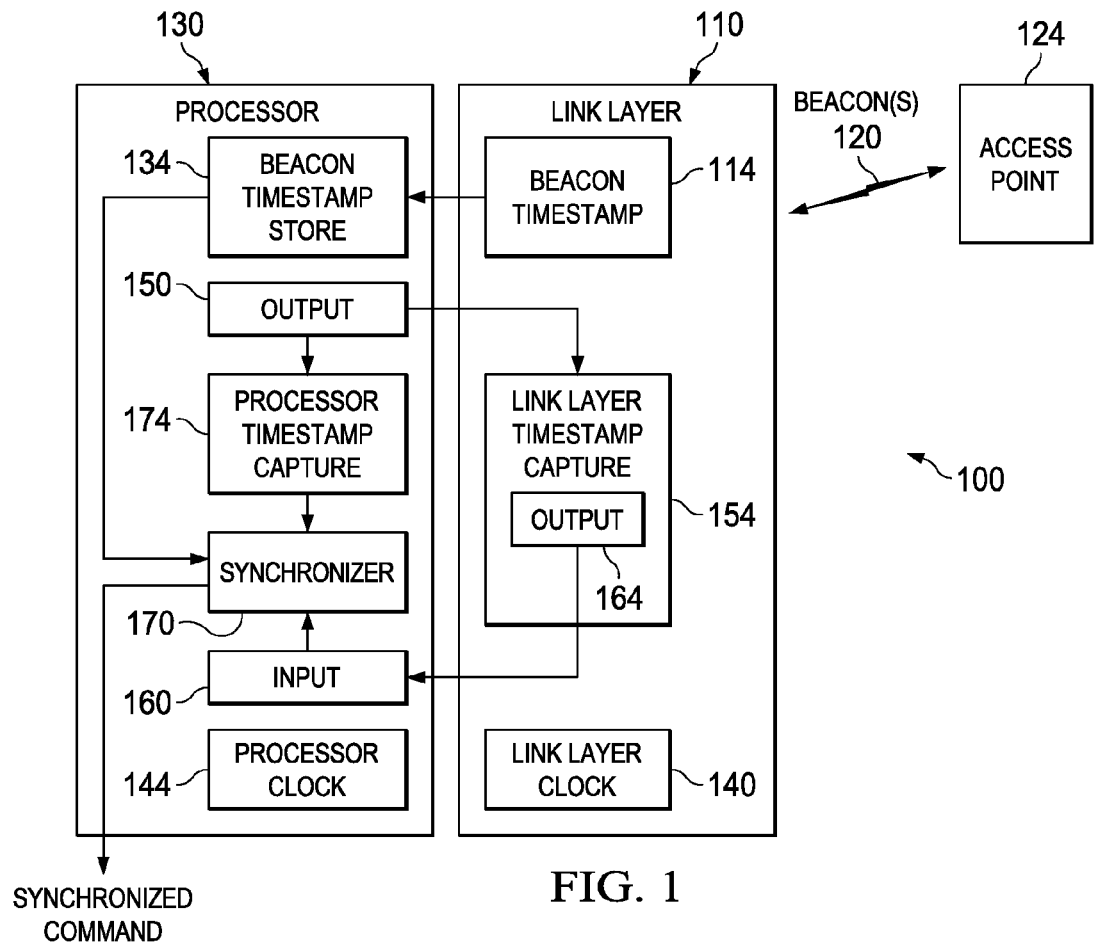
FIG. 1 illustrates an example of circuit for synchronizing applications to a wireless access point beacon.

FIG. 1 illustrates an example of circuit 100 for synchronizing applications to a wireless access point beacon. As used herein, the term circuit can include a collection of active and/or passive elements that perform a circuit function such as an audio circuit or control circuit, for example. The term circuit can also include an integrated circuit where all the circuit elements are fabricated on a common substrate, for example. The circuit 100 includes a link layer 110 that receives a beacon timestamp 114 from a wireless network 120. The beacon timestamp 114 can be generated via a wireless access point 124 that transmits beacons across the network 120.

The circuit 100 includes a processor 130 that receives the beacon timestamp 114 from the link layer 110 and stores it at 134. The stored beacon timestamp cannot be immediately processed for synchronization with other wireless devices on the network 120 since the stored timestamp is in reference to a link layer clock 140 as opposed to a processor clock 144. As such, various handshaking is performed between the link layer 110 and the processor 130 to determine timing differences between the link layer and processor. An output port 150 controlled by the processor 130 causes an interrupt at the link layer 110 to initiate a capture of a link layer timestamp at 154 of the link layer relative to the beacon timestamp 114 and stored timestamp 134. An input port 160 on the processor 130 receives the link layer time stamp from a link layer output 164 in response to the interrupt at the link layer 110.

A synchronizer 170 captures a processor timestamp 174 relative to the beacon timestamp 134 and determines a time offset value relative to the received link layer time stamp 154 from the link layer output 164 by computing a difference between the processor timestamp and the link layer timestamp. The time offset value is combined with the processor timestamp 174 to synchronize the processor 130 with respect to the beacon timestamp 114 received at the link layer. As used herein, the term processor time stamp 174 refers to the amount of time difference in clock cycles that the processor 130 has advanced past the time that the beacon timestamp was stored at 134. The term link layer timestamp 154 refers to the amount of time that has elapsed as observed by the link layer 110 since the beacon timestamp 114 has been captured. The difference in these two times—processor timestamp 174 versus link layer timestamp 154 defines the time offset value employed for synchronization purposes as described herein.

The time offset value determined by the synchronizer 170 can be added to or subtracted from the processor timestamp 174 to synchronize the processor 130 with respect to the beacon timestamp 134. As noted previously, the link layer 110 can generate an interrupt in response to the output port 150, where the interrupt causes the link layer to capture the link layer timestamp 154 relative to the beacon timestamp 114. The link layer output port 164 transmits the link layer time stamp 154 to the input port 160 on the processor 130. The beacon timestamp 114 includes the time that the beacon was received by the link layer 110 and a beacon sequence number, where the time offset value is combined with the beacon sequence number by the processor 130 to form a starting command for an application. As will be described below with respect to FIGS. 2-4, an application layer can be provided that is controlled by the processor 130. The application layer utilizes the starting command to synchronize operations of an application with at least one other application operating across the wireless network 120 on a wireless device.

In one example, such synchronized applications can be a synchronized wireless audio application, for example, having at least two speakers that are synchronized to receive wireless audio data at a time relative to the same beacon sequence number and time offset value that is about the same period in time relative to the beacon sequence number. In another example, a synchronized wireless controller application could be provided having at least two slave devices that are synchronized to receive wireless control data from a master control device at a time relative to the same beacon sequence number and time offset value that is about the same period in time. In yet another example, synchronized applications can include a synchronized wireless video application having at least two video devices that are synchronized to receive wireless video data at a time relative to the same beacon sequence number and time offset value that is about the same period in time relative to the beacon sequence number. The various application examples are illustrated and described below with respect to FIGS. 5-7.

Figure 2:
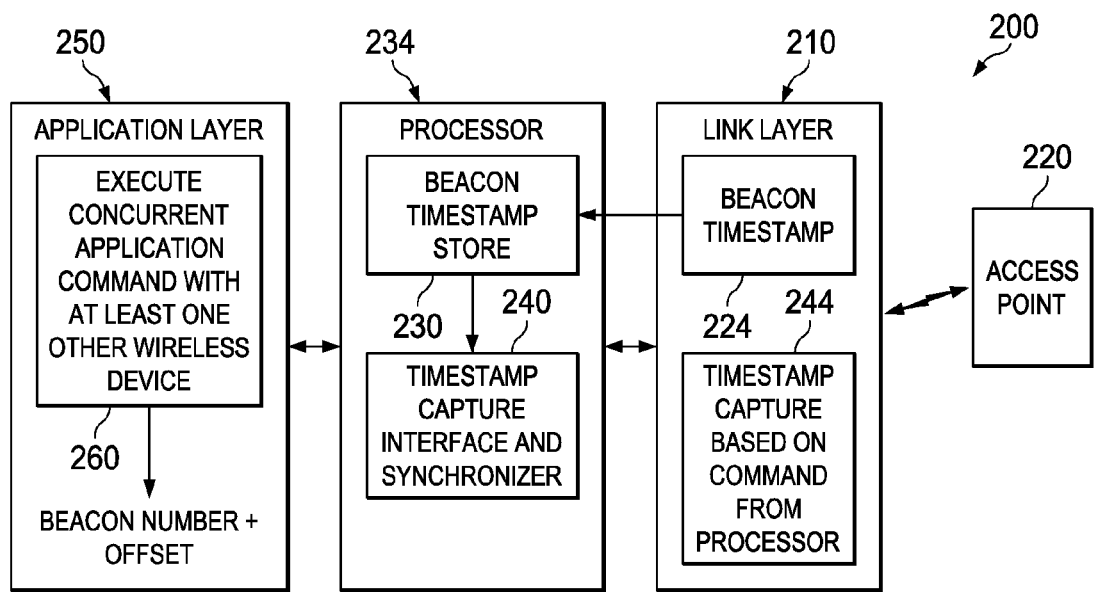
FIG. 2 illustrates an example of system for synchronizing applications to a wireless access point beacon.

FIG. 2 illustrates an example of system 200 for synchronizing applications to a wireless access point beacon. In this example, a link layer 210 interfaces with an access point and stores a beacon timestamp at 224. The beacon timestamp 224 is stored (e.g., downloaded) as a copy at 230 of processor 234. A timestamp capture interface and synchronizer 240 interfaces with the link layer at 244 to determine a time offset value for the processor 234 relative to the beacon timestamp 224 and 230. The timestamp capture 240 can include the input and output ports previously described with respect to FIG. 1 to coordinate with the link layer 210, for example. When the time offset value has been determined, an application layer 250 receives the time offset value and utilizes it to synchronize with at least one other wireless device via an application command at 260.

For example, the application command could be to start a wireless speaker concurrent in time with another wireless speaker that is separated by a wireless connection. Such application command could based on starting on a given beacon sequence number received after the captured beacon timestamp (e.g., beacon number 4 past the captured and stored beacon timestamp) plus the determined time offset value at 240 of the processor 234. Each speaker would likely have a different computed time offset value but concurrent operations would occur since each has been synchronized in time to a predetermined beacon timestamp that is received after the timestamp that was captured at 224 and stored at 230.

Figure 3:
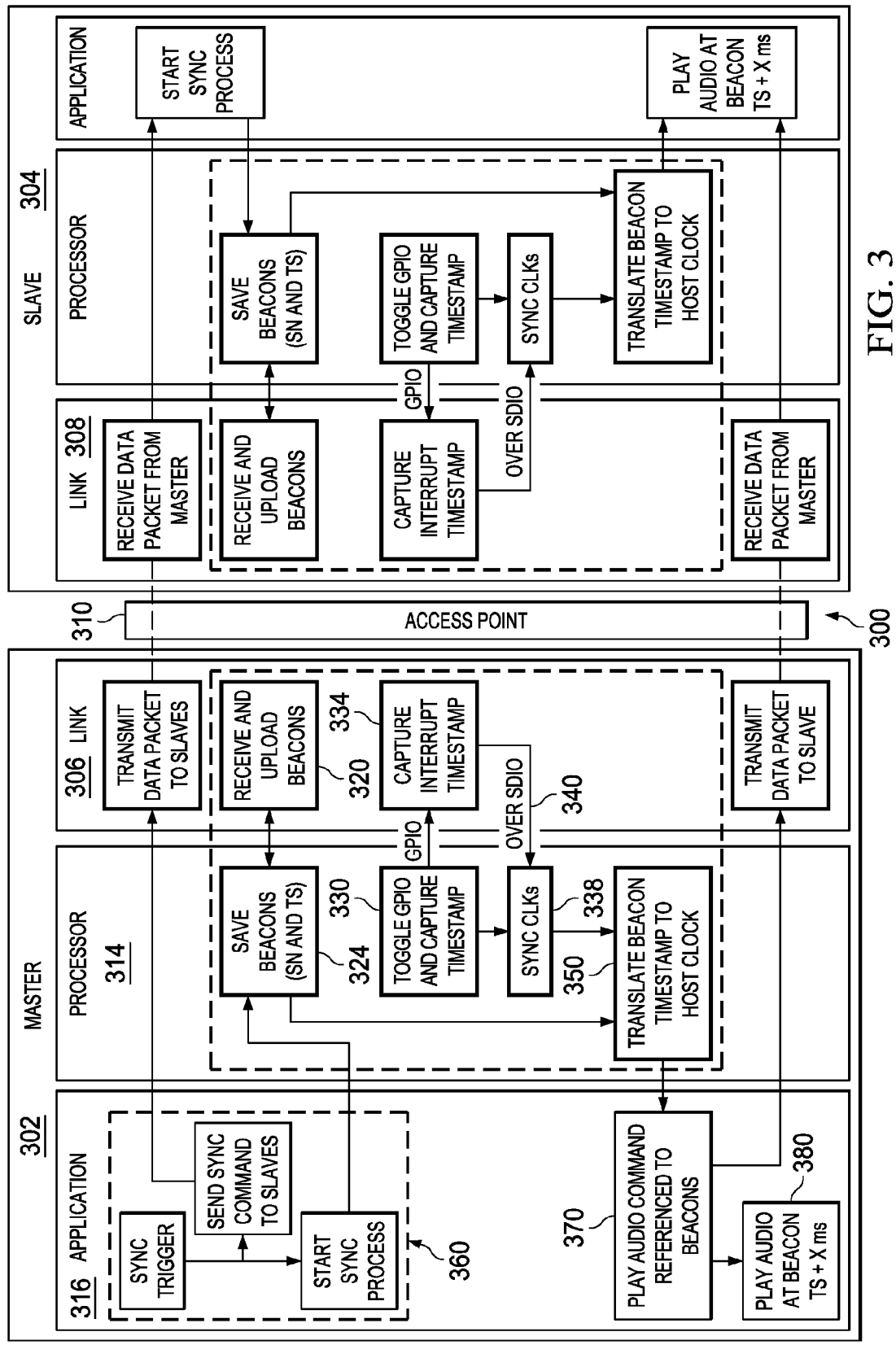
FIG. 3 illustrates an example of system for synchronizing master and slave devices to a wireless access point beacon.

FIG. 3 illustrates an example of system 300 for synchronizing master 302 and slave devices 304 to a wireless access point beacon. For purposes of brevity, the synchronization for the master 302 will be described but the similar principles can be applied to the slave at 304. In this example, synchronization can be divided into three levels although other configurations are possible. Link level synchronization can occur at a media access control (MAC) level synchronizing MAC clocks between stations. This is shown as link layers 306 and 308 communicating to access point 310. Host level synchronizing occurs at processor level 314 where host clock of the processor is synchronized to the MAC clock. Application level synchronizing occurs at an application layer 316 where an application layer clock is synchronized to the host clock to allow synchronized operations (e.g., synchronized audio playback over wirelessly connected speakers).

With respect to MAC level synchronization of the link layer 306, the access point 310 transmits beacons. The beacons are received at the all devices at about the same time (neglecting time of flight). When a beacon is received, each device will capture the MAC timestamp at a deterministic point during the reception process. This is shown at 320. The captured timestamp is passed to the host processor at 324. With respect to host level synchronization, each host now knows the time of arrival of a specific beacon and can start its playback (or other synchronized operation) relative to this time. However as noted previously, the source of this time stamp is the MAC clock and thus, the system has to synchronize it to the host processor clock (not shown).

The host processor 314 generates an interrupt at 330 to the MAC using a dedicated general purpose input/output (GPIO), for example. During the handling of this interrupt, both the processor 314 and link layer 306 MAC capture their time stamp concurrently at 330 and 334 respectively. The link layer MAC then transfers this timestamp to the host processor 314 at 338 over a dedicated serial data (SDIO) transaction at 340, for example. The host processor 314 calculates the delta between its clock and the MAC clock using: HOST_TS_DURING_INTERRUPT−MAC_TS_DURING_INTERRUPT, for example at 350. The host processor 314 can now translate the beacons timestamp at 350 from the MAC clock to its own clock.

The application layer 316 can be executed in a variety of different manners depending on application needs (e.g., audio application, video application, control application and so forth). In this example, each host processor 314 has determined the time of the beacon arrival, since all beacons are received at about the same time, this can be used as the point to start the audio playback (or other synchronized application) concurrently. This could include a buffer by notifying all wireless devices to start playback a certain number of milliseconds after reception of the next beacon, for example. As shown, the application layer can include a start synchronization block 360 and an application command 370 that is initiated from the beacon offset determinations of the processor 314. This can include initiating a command a certain number of milliseconds after a given beacon sequence number at 380. As shown, the slave device 304 can be synchronized in substantially the same manner as that described herein for the master device 302.

Figure 4:
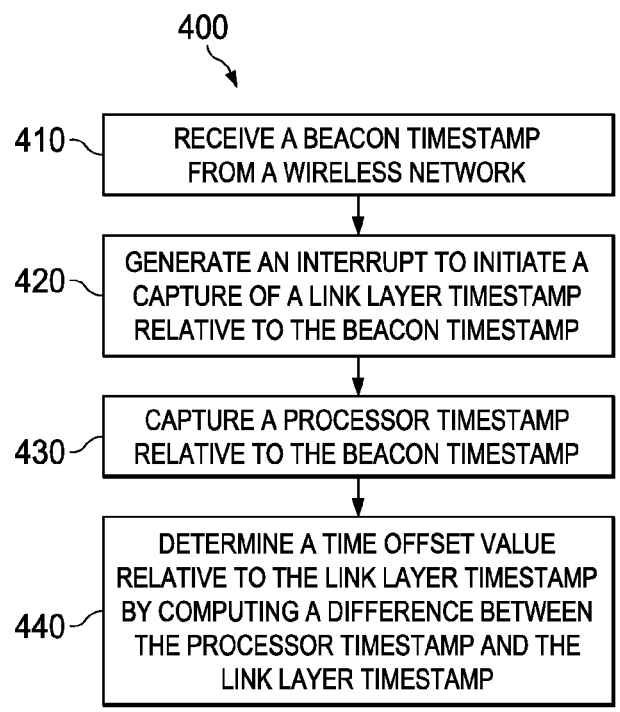
FIG. 4 illustrates an example method for synchronizing applications to a wireless access point beacon.

In view of the foregoing structural and functional features described above, an example method will be better appreciated with reference to FIG. 4. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an IC or a controller, for example.

FIG. 4 illustrates an example method 400 for synchronizing applications to a wireless access point beacon. At 410, the method 400 includes receiving a beacon timestamp from a wireless network (e.g., via link layer 110 and access point 124 of FIG. 1). At 420, the method 400 includes generating an interrupt to initiate a capture of a link layer timestamp relative to the beacon timestamp (e.g., via output 150 and link layer timestamp capture 154 of FIG. 1). At 430, the method 400 includes capturing a processor timestamp relative to the beacon timestamp (e.g., processor timestamp capture 174 of FIG. 1). At 440, the method 400 includes determining a time offset value relative to the link layer time stamp by computing a difference between the processor timestamp and the link layer timestamp (e.g., via synchronizer 170 of FIG. 1). The time offset value can be combined with the processor timestamp to synchronize at least two wireless devices operating on the wireless network. As noted previously, the beacon timestamp includes the time that the beacon was received by a link layer and a beacon sequence number. The time offset value can be combined (e.g., added or subtracted) with the beacon sequence number by the processor to form a starting command for an application.

Figure 5:
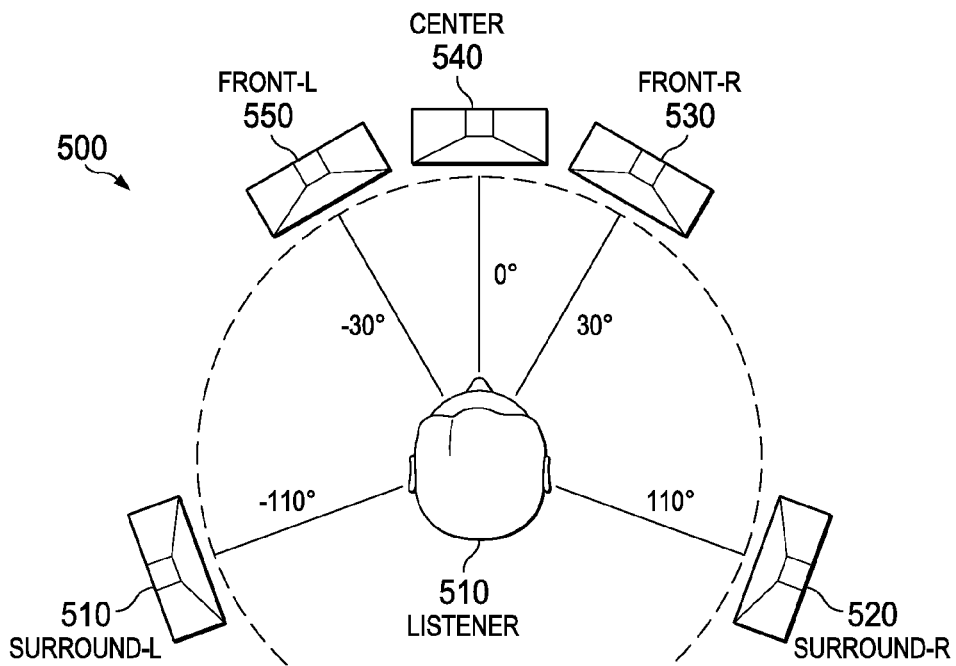
FIG. 5 illustrates an example application where wireless audio devices are synchronized over a wireless network.

FIG. 5 illustrates an example application 500 where wireless audio devices are synchronized over a wireless network. In this example, a listener at 504 is surrounded by wireless speakers at 510 through 550. Each of the speakers can be configured to synchronize to a wireless beacon as described herein, where sound playback has concurrently at each speaker and substantially without delay due to synchronization. Thus, in this example, a synchronized wireless audio system can be provided having at least two speakers that are synchronized to receive wireless audio data at a time relative to the same beacon sequence number and time offset value that is about the same period in time as determined from the point of view of each speaker 510 through 550. Since each speak is synchronized to the same beacon plus or minus a determined offset at each speaker, each speaker can start and stop its respective audio playback at substantially the same time (e.g., start/stop less than five microseconds of each other).

Figure 6:
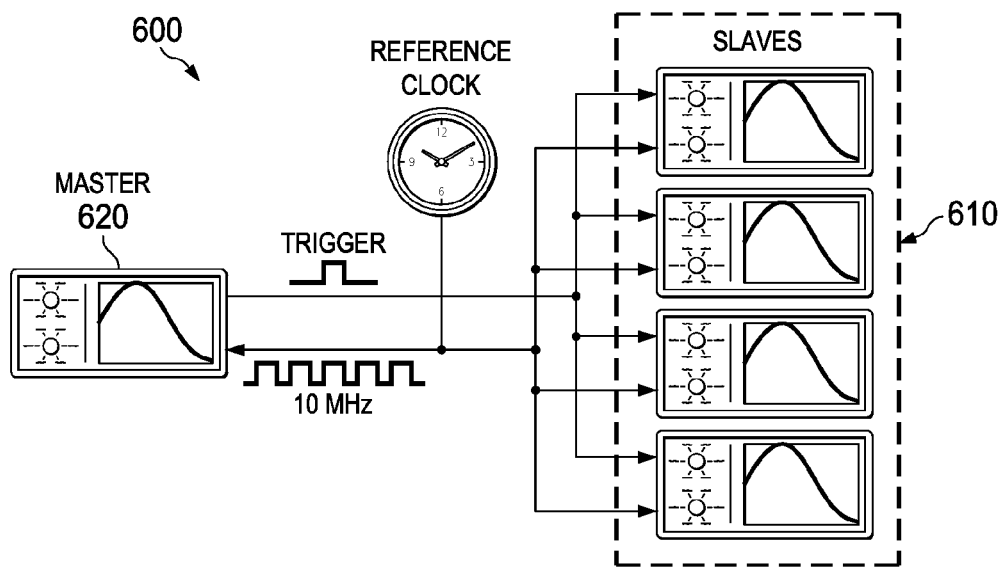
FIG. 6 illustrates an example application where wireless control devices are synchronized over a wireless network.

FIG. 6 illustrates an example application 600 where wireless control devices are synchronized over a wireless network. In this example, one or more slave devices at 610, which can issue trigger start and stop commands to each slave. In this case, each device slave 610 or master 620 can be synchronized to a reference clock which is derived from wireless access beacon processing described herein. Thus, in this example, a synchronized wireless controller application is provided having at least two slave devices that are synchronized to receive wireless control data from a master control device at a time relative to the same beacon sequence number and time offset value that is about the same period in time.

Figure 7:
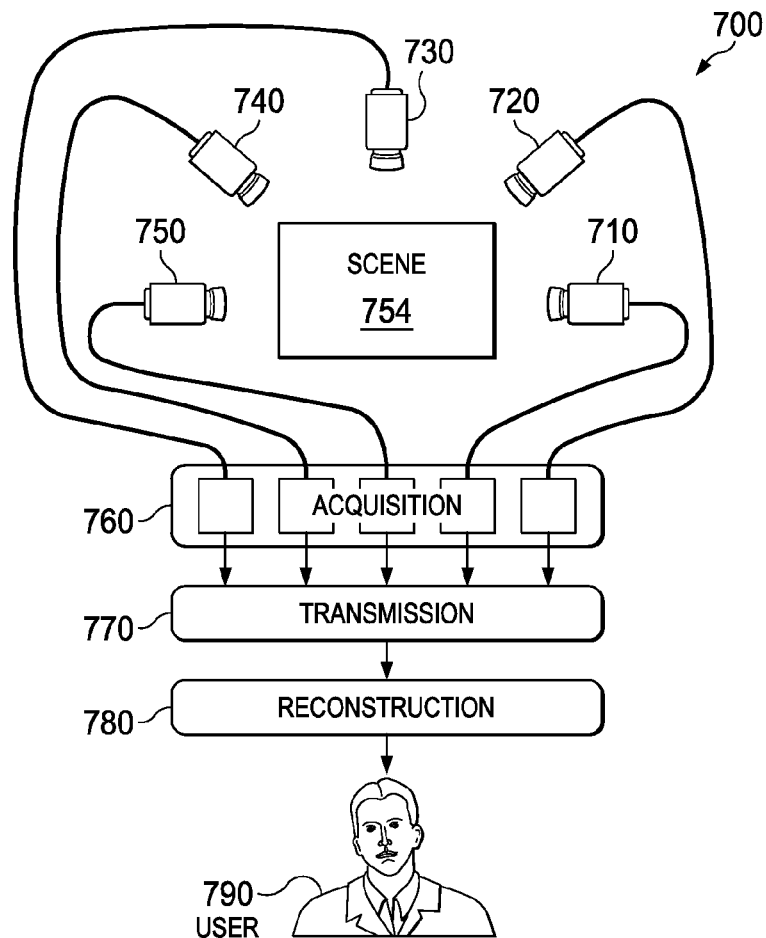
FIG. 7 illustrates an example application where wireless video devices are synchronized over a wireless network.

FIG. 7 illustrates an example application 700 where wireless video devices are synchronized over a wireless network. In this example, wireless video cameras 710 though 750 capture images of a scene 754. The images are transferred to an acquisition layer 760 where timing between cameras is adjusted via a transmission layer 770 such as via the beacon processing described herein. After timing has been adjusted between captured images at the transmissions layer, image reconstruction can commence at 780 for a user at 790. In this example, a synchronized wireless video system is provided having at least two video devices that are synchronized to receive wireless video data at a time relative to the same beacon sequence number and time offset value that is about the same period in time.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
   a link layer having a link layer beacon timestamp store and a link layer clock, the link layer beacon timestamp store for storing a beacon timestamp received from a wireless network;
   a processor having a processor beacon timestamp store coupled to the link layer beacon timestamp store and having a processor clock separate from the link layer clock, the processor beacon timestamp store for storing the beacon timestamp from the link layer beacon timestamp store;
   the processor including an output port coupled to the link layer to initiate a capture of a link layer timestamp, the link layer timestamp is the amount of time that has elapsed as observed by the link layer since the beacon timestamp was captured;
   the processor including an input port coupled to the link layer to receive the link layer timestamp from the link layer; and
   a synchronizer coupled to a processor timestamp and the input port, the processor timestamp is the amount of time difference in clock cycles that the processor has advanced past the time that the beacon timestamp was stored at the processor beacon timestamp store, the synchronizer determining a time offset value by computing a difference between the processor timestamp and the link layer timestamp, and combining the time offset value with the processor timestamp to synchronize the processor with the beacon timestamp stored at the link layer.

2. The system of claim 1, in which the time offset value is added to or subtracted from the processor timestamp to synchronize the processor clock with the beacon timestamp received at the link layer.

3. The system of claim 1, in which the link layer includes a link layer output port to transmit the link layer timestamp to the input port on the processor.

4. The system of claim 1, in which the beacon timestamp includes the time that the beacon was received by the link layer and a beacon sequence number, where the time offset value is combined with the beacon sequence number by the processor to form a starting command for an application.

5. The system of claim 4, including an application layer that is controlled by the processor, the application layer utilizes the starting command to synchronize operations of an application with at least one other application operating across the wireless network on a wireless device.

6. The system of claim 5, in which the application and the at least one other application are a synchronized wireless audio system having at least two speakers that are synchronized to receive wireless audio data to the same beacon sequence number and time offset value.

7. The system of claim 5, in which the application and the at least one other application are a synchronized wireless controller system having at least two slave devices that are synchronized to receive wireless control data from a master control device to the same beacon sequence number and time offset value.

8. The system of claim 5, in which the application and the at least one other application are a synchronized wireless video system having at least two video devices that are synchronized to receive wireless video data to the same beacon sequence number and time offset value.

9. The system of claim 1, in which the beacon timestamp is generated by a wireless access point.

10. A method comprising:
    receiving a beacon timestamp from a wireless network in a link layer;
    storing the beacon timestamp in the link layer in response to receiving the beacon timestamp;
    copying the beacon timestamp from the link layer to a processor;
    generating an interrupt to initiate a capture of a link layer timestamp stored in the link layer, the link layer timestamp being the amount of time that has elapsed as observed by the link layer since the beacon timestamp was stored;
    capturing a processor timestamp, the processor timestamp being the amount of time difference in clock cycles that the processor has advanced past the time that the beacon timestamp was copied to the processor;
    determining a time offset value by computing a difference between the processor timestamp and the link layer timestamp; and
    combining the time offset value with the processor timestamp to synchronize the processor with the beacon timestamp received at the link layer.

11. The method of claim 10, in which the storing includes storing the time that the beacon timestamp was received by the link layer and a beacon sequence number.

12. The method of claim 10 in which the combining includes combining the time offset value with a beacon sequence number to form a starting command for an application.

13. The method of claim 10 including forming a starting command for an application in response to combining the time offset value with the processor timestamp.

14. The method of claim 13 including synchronizing the application, using the starting command, with at least one other application operating in a wireless device on the wireless network.

15. The method of claim 13 including synchronizing the application, using the starting command, and at least one other application in a wireless audio system having at least two speakers to receive wireless audio data.

16. The method of claim 13 including synchronizing the application, using the starting command, and at least one other application in a wireless controller system having at least two slave devices to receive wireless control data from a master control device.

17. The method of claim 13 including synchronizing the application, using the starting command, and at least one other application in a wireless video system having at least two video devices to receive wireless video data.

18. The system of claim 10 including generating the beacon timestamp from a wireless access point.

* * * * *